Fig.1.

Nov. 14, 1933.   J. ACHARD   1,935,343
MACHINE FOR RESISTANCE ELECTRIC WELDING
Filed March 13, 1931    8 Sheets-Sheet 2

Inventor
Jean Achard
by Robert W Byerly
his atty.

Fig.4.

Nov. 14, 1933.　　J. ACHARD　　1,935,343
MACHINE FOR RESISTANCE ELECTRIC WELDING
Filed March 13, 1931　　8 Sheets-Sheet 4

Nov. 14,'1933.   J. ACHARD   1,935,343
MACHINE FOR RESISTANCE ELECTRIC WELDING
Filed March 13, 1931   8 Sheets-Sheet 7

Inventor
Jean Achard
by Robert W Byerly
his atty

Patented Nov. 14, 1933

1,935,343

UNITED STATES PATENT OFFICE 1,935,343

MACHINE FOR RESISTANCE ELECTRIC WELDING

Jean Achard, Paris, France

Application March 13, 1931, Serial No. 522,336, and in France July 23, 1930

18 Claims. (Cl. 219—4)

It is known that resistance electric welding essentially comprises, like forge welding, heating of the pieces to the welding temperature, and, simultaneously, applying pressure to the two pieces being welded.

An electric current of high intensity at a low tension is caused to flow through the pieces which are, to effect this, placed between two electrodes connected to the secondary circuit of a suitable transformer through whose primary flows a current of normal industrial tension at a relatively low intensity.

The electrical and mechanical constitution of a welding machine must be such that the two essential operations: heating, and application of the mechanical pressure, can be effected through a single organ of control, such as a lever, pedal or the like, and in a very short time, which conditions are indispensable for working on an industrial scale.

The electrical part of the machine serves only to heat the pieces and to bring them to the welding temperature. It is controlled through a circuit breaker which sends the current into the pieces (or more accurately into the transformer) or cuts it off.

The working of this circuit-breaker is combined with that of the mechanical part of the machine so that the different phases of the operation of welding take place according to the proper order, and each one during a determined time.

The different phases are:

1. The compressing of the pieces under a certain pressure between the electrodes before the current is caused to flow through the machine.

2. The setting up of current through the machine while the pressure on the pieces is being increased.

3. The cutting off of the current while the pressure is maintained.

Generally the pressure is given through a spring which is compressed through the organ of control, such as pedal, lever or the like. In order to vary the pressure according to the pieces to be welded, the initial tension of the spring may be regulated.

The control of the circuit-breaker may be regulated so that it acts only when the electrodes of the machine are compressing the pieces to be welded and the pressure spring is already slightly compressed. Obviously, if the initial spacing of the pointed electrodes of the machine is changed, the adjustment of the circuit-breaker must also be changed.

The current may be cut off by means of any suitable device, which acts, in general, according to the stroke of the control rod.

The machine is operated as follows:

The operator presses on the pedal, and in so doing compresses the pieces between the electrodes.

By further pressing on the pedal, he sends the current through the machine, which heats the pieces, at the same time increasing the pressure. When he considers that the welding temperature is reached, he presses the pedal in completely, which cuts off the current, while the pressure is maintained on the pieces being welded.

The maintenance of the pressure last only for a very short time, just sufficiently long for the welded part to cool very slightly.

In this case, the length of time during which the current is allowed to flow, and consequently the temperature of the pieces, is left to the judgment of the operative.

The machine may also be made automatic, that is, the current may be cut off by an electro-magnetic, electro-pneumatic, or equivalent appliance, which will produce the operation of the circuit-breaker, relatively to its being closed either after a certain time determined beforehand, or when the intensity of the current has reached a certain value determined before hand, or else after a certain quantity of energy has passed through the machine, etc.

An automatic energy meter current breaker is also comprised in the present invention and will be hereinafter described.

The operator has then only to press on the pedal and the different phases of the welding operation will take place automatically in the given order.

The main objects of the present invention are the following:

1. To ensure that the closing of the circuit-breaker will be directly dependent on an initial given pressure applied to the pieces to be welded. Accordingly this apparatus is adjusted once and for all and it is impossible that the circuit-breaker should be closed before the pointed electrodes compress the pieces to be welded which are thus submitted to a well determined pressure, and this whatever the spacing of the electrodes may be.

2. To obtain a sudden release of the contact elements of the circuit-breaker at the desired moment of the cutting off of the current, so that the wear of the contact elements may be lessened.

3. That the adjustment of this release may be effected in accordance with the stroke of the rod controlling the operation of the circuit-breaker merely through an adjustable stop. This release may even be done away with to comply with certain conditions of work. It is only necessary to suitably displace said stop.

4. To produce said release through a device of the knuckle-joint type which comprises no sliding of the pieces with respect to each other with the object of obtaining an apparatus which cannot be put out of order and to do away with the wear of said pieces (to all practical purposes).

5. To be able eventually to control through electric means the operation of said circuit breaker by means of an auxiliary coil or any other device which may be combined with a temporizing apparatus, an energy meter, an electric intensity meter and so on, the working of the machine being thus made completely automatic.

In principle, the circuit-breaker proper according to the present invention is characterized in that:

1. The support or casing of the circuit breaker is part of the mechanical connections transmitting the pressure of the pedal or lever of control to the movable electrode.

2. The mechanical element, generally a push rod which transmits the effort to said support or casing of the circuit-breaker is not a part of the latter. It can move relatively to it, the connection between the two organs being ensured by an auxiliary spring;

3. The circuit breaker is constituted by a couple of small connecting rods, having each one a separate axis of articulation, and adapted to swing about a common axis, said connecting rods being normally fixed in a balanced position from which they are suddenly displaced when one of them meets a given stop.

The energy meter device is characterized by the combination of means as follows:

1. A disk or the equivalent, movable in the air gaps of several electro-magnets and capable, under the differential action of said electro-magnets, of turning through a determined angle measured from a fixed origin, and of producing, at the end of its motion, through the working of a contact device, directly or indirectly, the release of the circuit-breaker of the welding machine transformer.

2. An auxiliary circuit through which flows a part of the current passing through the machine and which includes an electro-magnet. According to the intensity of the current flowing through said electro-magnet, the movable armature thereof places in shunt on the main circuit either the electro-magnet that ensures the immobilization of the disk in its original position, or the electro-magnet that determines the displacement of said disk.

Preferred embodiments of the invention will be hereinafter described with reference to the appended drawings given merely by way of example and in which.

Adverting to Figs. 1 to 5:

These views show the essential elements of a welding machine, namely a frame 1 supporting two horizontal arms, one of which, 2 is stationary and the other one, 3, movable about an axis 4.

Figure 1:
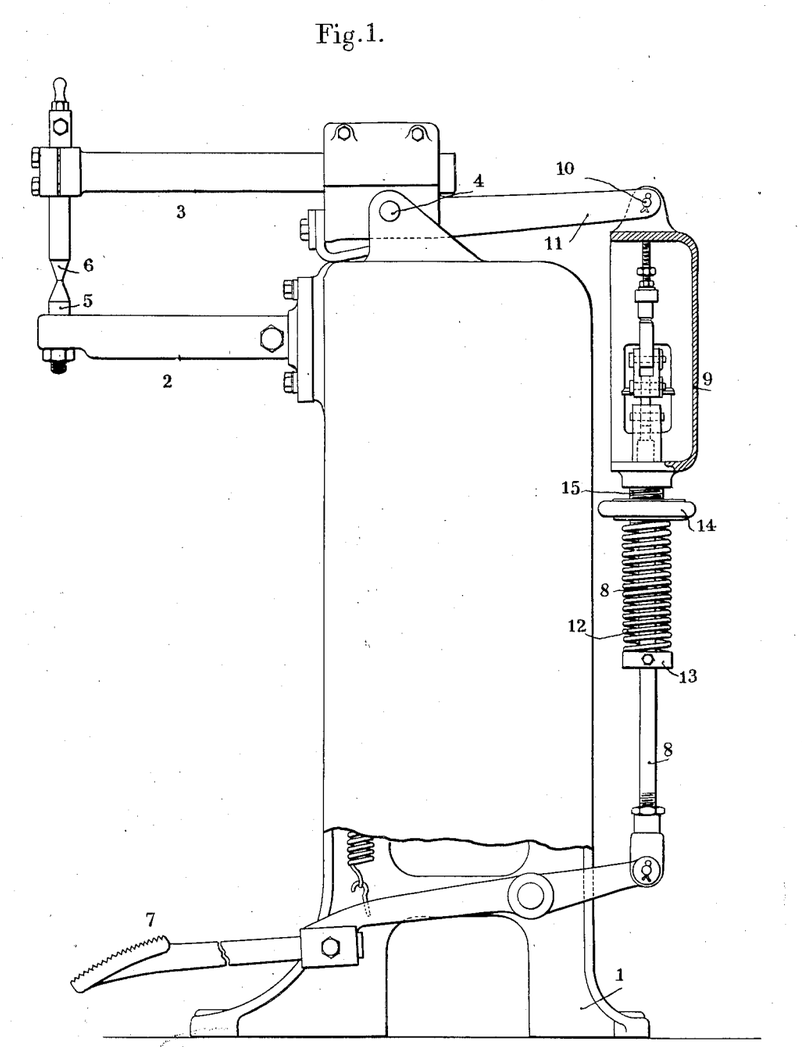
Fig. 1 is a general view of a first machine, partly in elevation partly in section.

Two electrodes 5, 6 are secured at the ends of said arms respectively.

The displacement of movable electrode 6, carried by the upper arm, is controlled through a pedal 7 disposed close to the foot of the operator.

According to the invention, pedal 7, when lowered, causes a rod 8 to move upwardly. Said rod supports a casing 9 in which is disposed the automatically operating circuit breaker adapted to produce a sudden cut off of the current and which will be hereinafter described.

At the top of said casing is pivotally mounted in 10 a lever 11 which drives the upper electrode-carrying arm 3.

Figure 2:
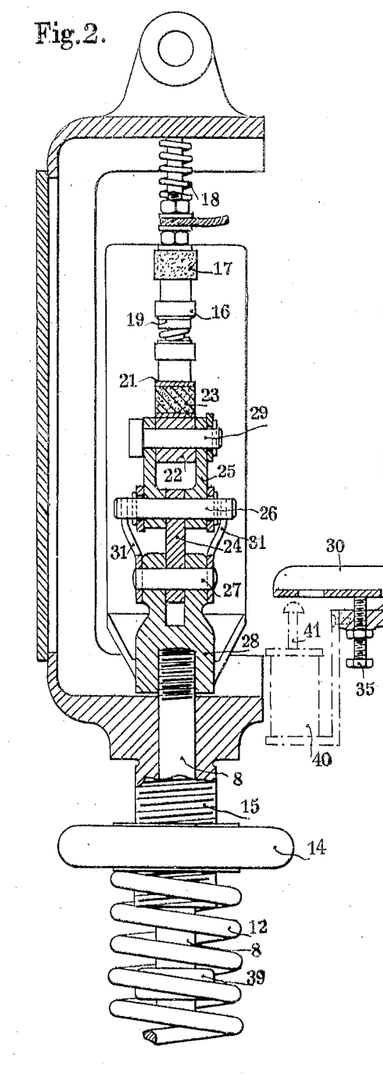
Fig. 2 is a sectional view, on an enlarged scale, of a detail of the circuit-breaker and its mechanical connection with the pressure transmitting organs.

Rod 8 is not integral with the circuit breaker casing; it is adapted to move inside the latter with a relative sliding motion. The connection between the two pieces is ensured through a spring 12, which bears on the one hand on a fixed shoulder 13 carried by rod 8, and on the other hand on a movable stop consisting of a small operating hand-wheel 14 adapted to screw on a threaded part 15 of casing 9, thus permitting to modify the initial tension of spring 12.

Casing 9 contains two pairs of contact-studs.

The upper contact studs 16—16' are connected to the primary circuit of the transformer of the machine. They are supported by an insulating cross member 17 which is applied by springs 18 against stops 19—19' when the machine is not working.

The lower contact studs 20—20' are electrically connected, for instance through a copper plate 21. They are supported by a cross member 22, an insulating plate 23 being interposed between said cross member and said contact studs.

Rod 8 serves to control the displacement of cross member 22 through an articulated mechanism which forms in itself an important part of the invention.

Figure 3:
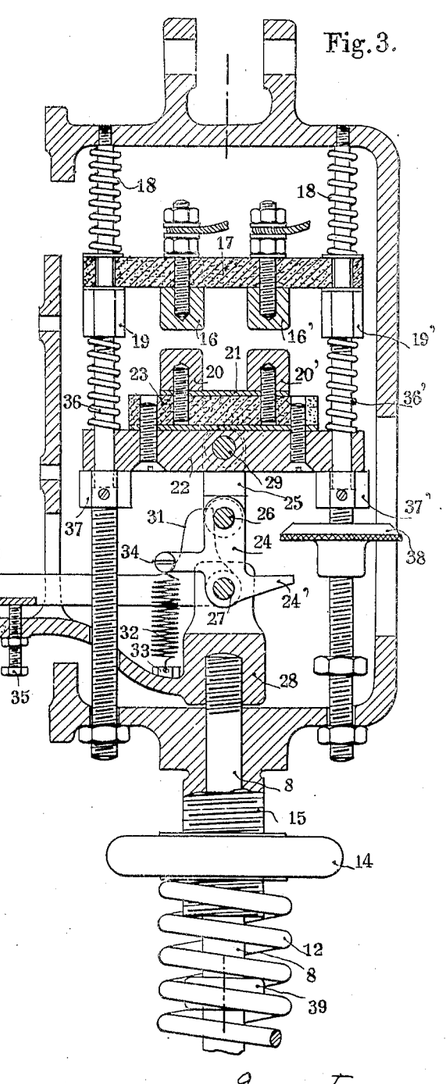
Fig. 3 is a sectional view at right angles to the preceding one; said two last views show the machine while at rest or at the beginning of its operation.
Figure 4:
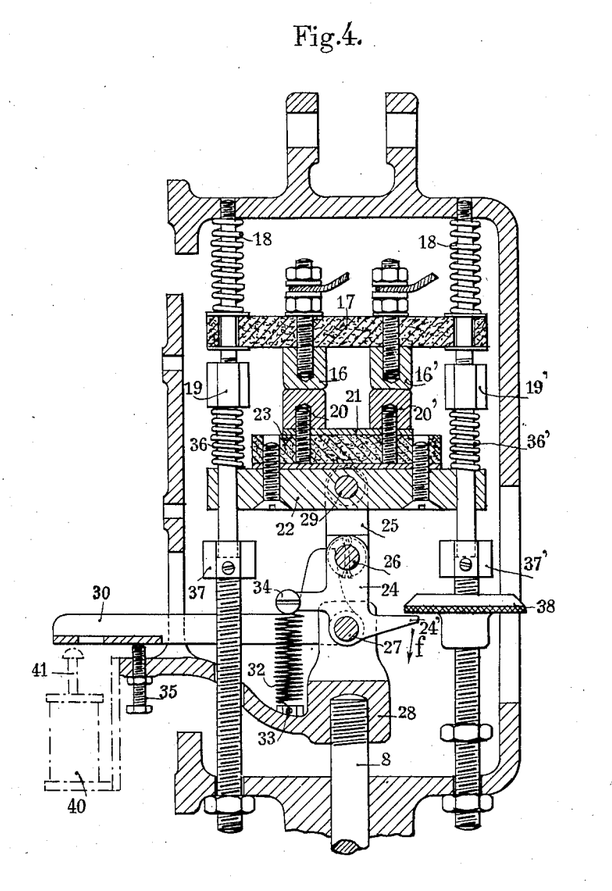
Figs. 4 and 5 are two sectional views analogous to that of Fig. 3 but corresponding respectively to the moment immediately preceding the cutting off of the current and to the moment following said cutting off.

Said mechanism comprises two small connecting rods 25—25 articulated about a common axis 26. On either side of said axis said connecting rods are articulated, the first 24, about an axis 27, to a piece 28 upon which acts the end of rod 8, the second 25, about an axis 29, to the contact studs-carrying cross member 22.

A lever 30, pivotally mounted on axis 27, is provided at its end with two wings 31 against which axis 26 is normally applied owing to the action of a spring 32 secured in 33 to piece 28 and in 34 to connecting rod 24.

A screw 35 makes it possible to adjust the position of lever 30 in such manner that the articulated system constituted by the connecting rod may be normally on the dead point that is in a position in which the three axes 26—27 and 29 lie on the same straight line.

Cross member 22 is normally kept at a distance from the upper contact studs by means of springs 36—36' so as to bear against stationary stops 37—37'.

In the vertical plane of a projection 24' of rod 24 is disposed an adjustable release stop 38 secured to a fixed part of the casing.

The working of this device takes place as follows:

The operator presses down pedal 7 and thus compresses the pieces to be welded between electrodes 5—6. Rod 8 and the circuit-breaker casing move as a single unit.

By further pressing down pedal 7, the operator produces a relative displacement of rod 8, which moves upwardly in the circuit-breaker. Said displacement can only be effected through compression of spring 12, so that when studs 20—20' come into contact with studs 16—16', a supplementary compression corresponding to the distance between the two pairs of studs has been imparted to spring 12.

The circuit of the transformer will therefore be completed and the current will flow through the machine only when the pieces to be welded have been submitted to this well determined total compression.

As rod 8 further moves upwardly owing to the action exerted by the pedal, the lower contact studs will raise the upper studs, and springs 18—18' and 36—36' will be accordingly compressed. Said compression of the spring will ensure a steady contact and a good flow of the current.

In this way the current is sent in the machine and simultaneously the pressure of the electrodes on the pieces to be welded is increased.

Figure 5:
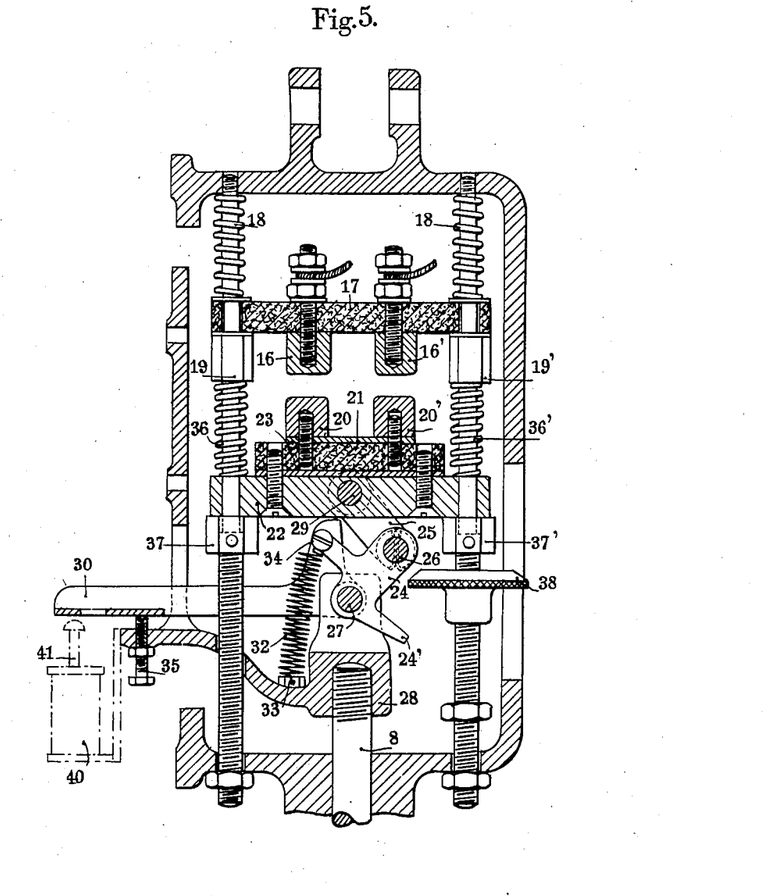

In the semi automatic operation of the device, when the operator thinks that the welding temperature has been reached, he fully presses down the pedal. Projection 24' then comes into contact with adjustable stop 38 (Fig. 4) which imparts a slight rotation to connecting rod 24 (arrow f) and thus destroys the state of equilibrium of the system 24—25. Said connecting rods 24—25 are rotated by the action of springs 36—36', their common axis of articulation being suddenly pushed out of line with axes 29—27 (Fig. 5).

Spring 32 is then stretched.

Cross member 22 comes to bear against stationary stops 37—37'.

The current is thus very suddenly cut off owing to the expansion of springs 36—36'.

It should be noted that, in spite of the current being cut off, the pressure on the pieces to be welded is maintained.

The maintenance of said pressure lasts but for a very short time, corresponding to a slight cooling of the weld.

The time during which the current is allowed to pass and accordingly the temperature of the pieces to be welded is, in this case, left to the judgment of the operator, according to the conditions under which the welding operation takes place.

When, by releasing the pedal, the operator allows rod 8 to move downwardly, the articulated system is brought back to its original position. Connecting rod 24, under the action of spring 32 is again applied against the wings 31 of lever 30, which comes to butt against stop screw 35, the whole system being brought back to its original position when the compression of main spring 12 is equal to its original value.

Stops 19—19' of the upper cross member 17 are adjustable, which makes it possible to modify the spacing of the contact studs and to compensate for their wear.

It has already been said that release stop 38 is adjustable and therefore produces the sudden cutting off of the current after a determined portion of the stroke.

A stop 39 serves to limit the stroke of rod 8.

The release of the apparatus might also be obtained by submitting lever 30 to a slight impact in the downward direction. It is thus possible to obtain the sudden cutting off of the current through electro-magnetic means, by providing on the circuit-breaker casing (or on piece 28) an electro-magnet 40, whose rod 41 is adapted to strike lever 30 as soon as the electro-magnet is energized by the flow of the current. In this case the electro-magnet is connected either to a relay of the watt-meter or ammeter type, or to a time relay. It is thus possible to produce the release of the circuit breaker either after a predetermined time of passage of the current or after a certain quantity of electrical energy has passed through the welding machine. An example of this arrangement will be hereinafter described.

Figure 6:
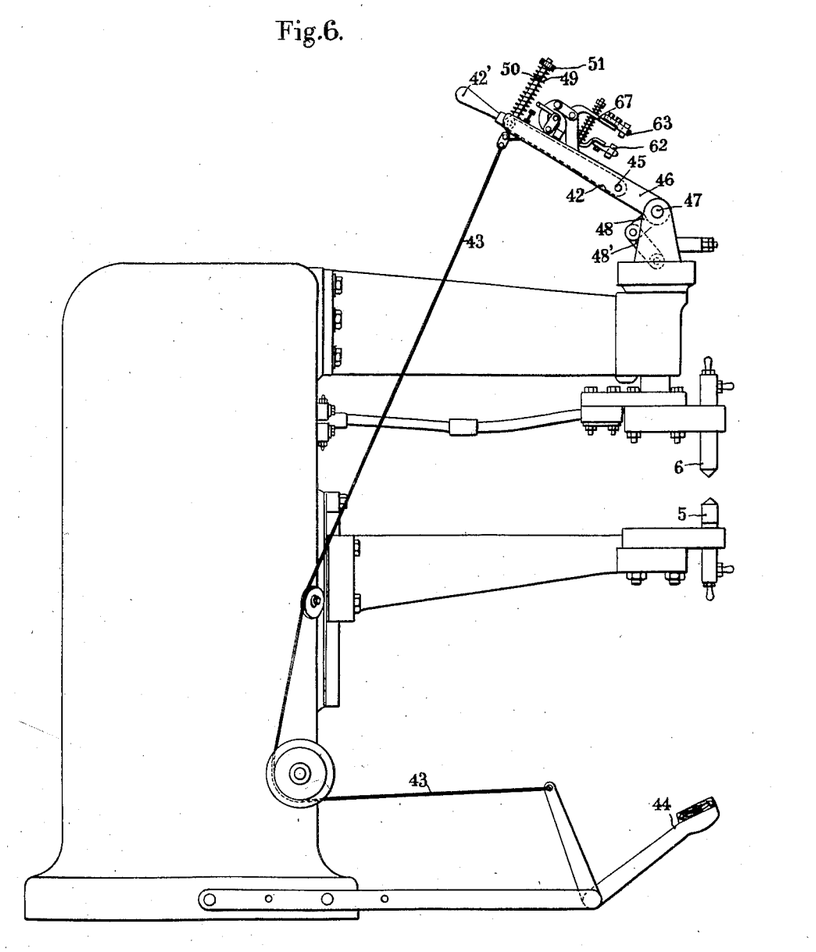
Fig. 6 is an elevational view of another machine including a different circuit-breaking device.
Figures 7, 8:
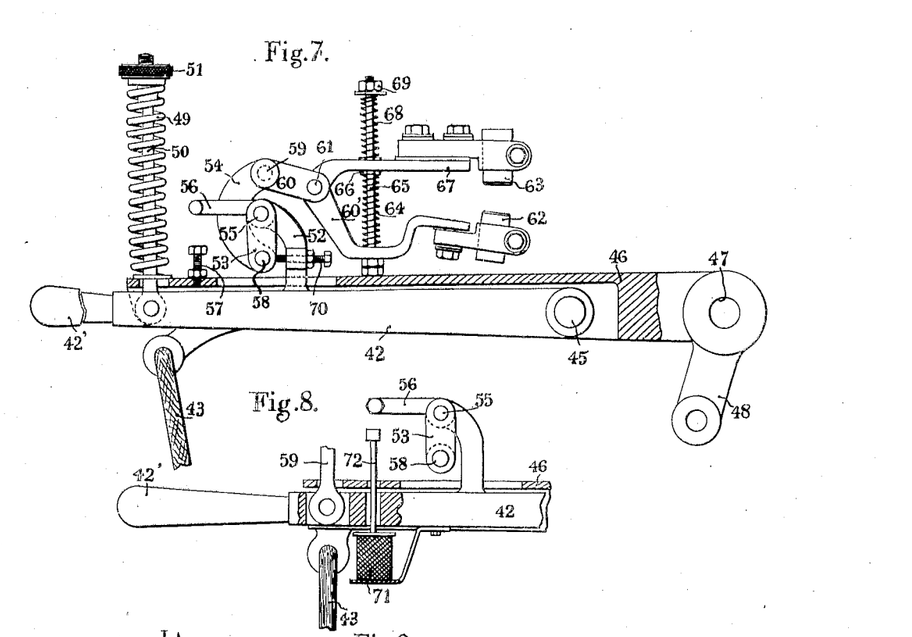
Fig. 7 shows at a larger scale the circuit-breaker of said machine before contact.
Fig. 8 shows the adaptation of an electro-magnetic control device to said circuit-breaker.

In the type of machine shown in Figs. 6 to 8, the control of the displacement of movable electrode 6 is effected through a lever 42 to which is secured a cable 43 connected to pedal 44. Lever 42 may also be manually operated by means of handle 42'.

Said lever 42 is articulated in 45 with another lever 46 which is adapted to rotate about an axis 47, and which ensures the downward motion of the upper electrode through a bent lever 48—48'. A spring 49 working in a manner similar to that of spring 12 of the preceding figures serves to connect levers 42 and 46, the first one being provided to this effect with a rod 50 having an adjusting screw 51 against which the upper part of the springs butts, while the other end of said spring bears upon lever 46.

Lever 42 carries and drives, through an arm 52, a system of two articulated rods 53—54; the first one, which is pivotally mounted in 55 on said arm 52, is provided with an arm 56 which is disposed on the vertical of an adjustable stop screw 57. The other rod 54, which is crescent-shaped, is articulated, on the one hand to rod about axis 58, and on the other hand in 59 to bent lever 60—60'. The latter may rotate about an axis 61 thus bringing the lower contact studs into contact with the upper studs 63.

The upward motion of arm 60' is effected against the action of a spring 64 wound about a rod 65 and bearing against a nut 66 which serves to adjust the spacing of the contact studs and to compensate for wear. Arm 67, which carries the upper studs, is submitted to the action of a spring 68, whose compression can be adjusted through a nut 69. Said spring 68 is adapted to ensure a certain pressure on the contact studs when the latter are in contact, this in order to obtain a good flow of current.

Rods 53—54 are fixed in a position called "dead point position" which may be adjusted by means of a screw 70 upon which normally bears rod 53.

Spring 49 being first brought to a determined state of compression, the angular displacement of levers 42—46 and the circuit breaker as a whole is produced by pressing down pedal 44 or handle 42', said angular displacement being effected about axis 47, thus producing compression of the pieces to be welded between electrodes 5—6. When the effort exerted on the pedal or on the lever is greater than the compression of spring 49, lever 42 starts rotating about axis 45, and during its downward motion it drives, through arm 52, the system of rods 53—54. The bent lever 60—60' will then rotate about axis 61 and bring studs 62 into contact with studs 63. By further increasing the pressure, springs 64 and 68 are compressed so that a steady contact between the studs is obtained. Spring 49 has also received, during the same time, a supplementary compression which, added to its initial compression, is applied to the pieces held between electrodes 5—6.

When the arm 56 of rod 53 comes, during its downward motion, into contact with stop screw 57, the equilibrium of the articulated system of rods is destroyed. Said rods suddenly pivot under the action of spring 64, the studs carrying arm 60' being thus suddenly moved away from upper arm 67. The current is thus suddenly cut off.

When lever 42 or pedal 44 is released, the system is brought back to its original position through the action of spring 49.

In this case also the release mechanism can be operated through electro-magnetic means, as shown in Fig. 8. To this effect an auxiliary coil 71 is provided the movable rod 72 of which is adapted to produce at the desired moment a percussion on arm 56 which causes the release of the circuit breaker and the cutting off of the current.

As in the preceding embodiment, coil 71 can be connected either to a relay of the wattmeter or ammeter type or to a time relay, the machine being thus rendered entirely automatic.

In resistance welding machines, the time during which the welding operation takes place is generally very short as it ranges from a small fraction of a second to some seconds, according to the importance of the weld.

It results that the quantities of energy that are brought into play may vary between very wide limits for the two following reasons:

First, the intensity of the welding current may be different from one point or operation to another for various causes: different state of cleanliness of the pieces, variations in the tension of the electric system, and so on.

On the other hand, the time during which current is allowed to pass through the pieces will vary from one welding operation to the following one, for it is wholly impossible for the operative to cut off current at exactly determined moments, corresponding to exactly equal values of the time during which current is allowed to pass.

It results therefrom that every weld is traversed by very different quantities of electricity and reaches temperatures that are also very different; said temperatures are lower than the welding temperature if the quantity of energy that is brought into play is not sufficient; in that case, the welding operation is not completed. On the contrary if the energy brought into play is too large, the temperature obtained is much too high with respect to the welding temperature, in which case the pieces are burned.

To obviate this drawback it has been tried to automatically produce the cutting off of the current, and this independently of the operator. To this effect several types of apparatus adapted to limit in an automatic manner the time during which current is allowed to pass have been devised.

These apparatus are usually of the electro-magnetic type. They essentially comprise an electro-magnet which is energized as soon as the primary current is set up in the welding machine. The movable armature thus set in motion is provided with a retarding device acting either through braking, or through hydraulic friction, or through inertia, or in a pneumatic manner, etc. . . and at the end of its stroke it produces the cutting off of the welding current. Said apparatus may also be entirely pneumatic or hydraulic.

These apparatus make it possible to accurately regulate the time during which current is allowed to pass through the pieces. For a given adjustment of the apparatus, all the welding operations will correspond to equal times of welding.

Under ideal circumstances according to which the intensity of the welding current would always remain constant, such apparatus would give a complete solution of the problem since the quantities of energy brought into play would always be the same. But said intensity of the welding current is a function of irregular elements and accordingly is itself irregular. The different welding operations will therefore take place under different conditions and consequently the use of apparatus of that kind does not permit to ensure the regularity and the safety of the welded pieces.

The present invention has for its object to produce the cutting off of the current when a certain quantity of energy, which is determined in advance as being necessary for the obtainment of a satisfactory weld, has passed through the pieces to be welded, and that whatever be the value of the intensity of the current that passes through the welding machine, the time during which said current is allowed to pass being automatically modified.

Figure 9:
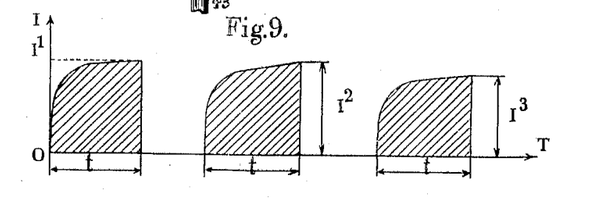
Fig. 9 shows diagrams corresponding to welding by means of a machine comprising an automatic circuit-breaker operating after a constant time.
Figure 10:
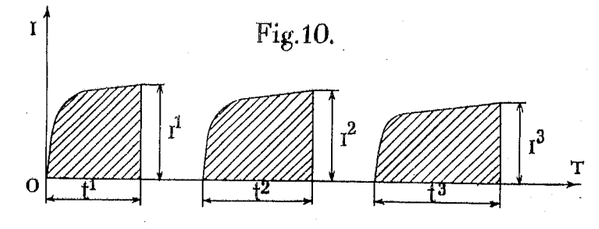
Fig. 10 shows diagrams of the intensity at the points of welding with a machine comprising an energy meter automatic circuit-breaker according to the present invention.

The results obtained by applying the two methods may be shown by the diagrams of Figs. 9 and 10 of the appended drawings. The times are given in abscissas and the intensities of the current in ordinates.

In Fig. 9 are shown the curves of weldings obtained with a machine fitted with an automatic circuit breaker acting after a constant time $t$. The intensities corresponding to each welding are $I^1$, $I^2$ and $I^3$.

The quantities of energy brought into play for each welding are shown by the hatched surfaces and are accordingly different from each other.

Fig. 10 shows diagrams of weldings obtained with a machine fitted with a circuit-breaker acting after the passage of a certain quantity of energy through the machine according to the invention.

The periods of time corresponding to the weldings $t^1$, $t^2$, $t^3$ corresponding to welding intensities $I^1$, $I^2$, $I^3$ are not equal, but their values are such that the hatched surfaces, which represent the quantities of energy passing through the pieces to be welded, are the same for all the weldings.

The invention consists in producing the release of the circuit-breaker of the feed circuit of the welding machine transformer by means of a device that is rather similar to a single phase current electric energy meter.

Figure 11:
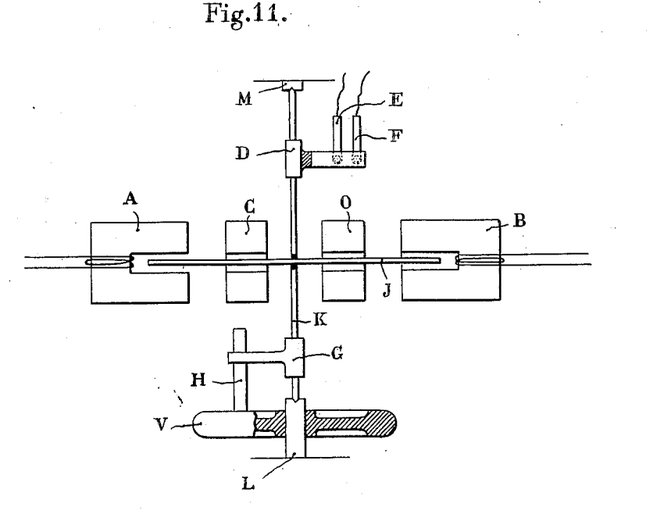
Figs. 11 and 12 are an elevational and a plan view respectively of said circuit breaker.
Figure 12:
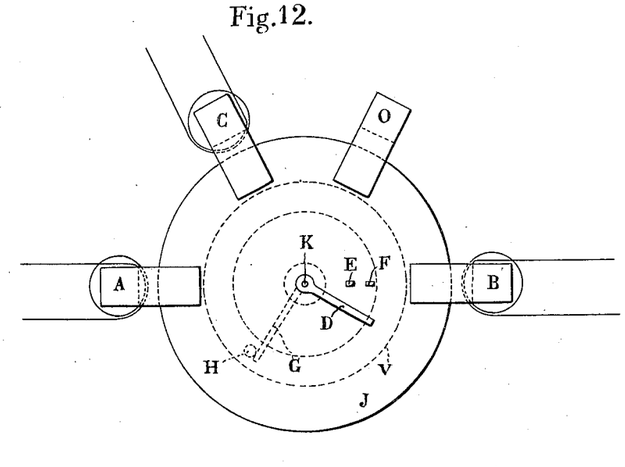

Adverting to Figs. 11 to 14:

The device essentially comprises a disk J, made of aluminium or any other light metal, mounted in an insulated manner on an axis K adapted to rotate in two pivots L and M.

Said disk J is movable in the air gap of three electro-magnets, one A provided with a series winding placed in shunt on the terminals of the welding machine, a second one B traversed by a portion of the current passing through the welding machine, owing to its connection to an intensity transformer T (Fig. 13), and the third one C which is in shunt and produces a torque which is equal and directly opposed to that which corresponds to the resultant of the actions of electro-magnets A and B. Disk J also passes through the air gap of a powerful magnet O adapted to exert thereon a braking action.

A small blade D is secured to axis K, and said blade is adapted to meet, during its movement of rotation, two contact elements E and F, which are thus electrically connected. Axis K also carries a finger G which, during the rotation of the disk in the direction opposite to that which closes contact E—F, limits the displacement of disk J by butting against a small rod H secured to an adjusting wheel V. The position of said stop H can thus be angularly displaced about axis K.

The operation of this device will be described with reference to Fig. 13.

In said figure, A, B, C are the electro-magnets acting on disk J. The transformer M of the welding machine with its primary $p$ and its secondary $s$ is connected to the terminals Q of the electric feed system. Through an intensity transformer T, a portion of the current is caused to pass through the auxiliary circuit W in which is inserted electro-magnet B. In the same circuit is also included another electro-magnet Z whose armature, always submitted to the action of a spring R, serves to close a shunt of the main circuit including electro-magnet C, when the apparatus is at rest. The displacement of said armature, which brings it from contact Y to contact X which is connected to electro-magnet A, takes place only when the current passing through electro-magnet Z has reached a certain intensity, which is determined in advance, once and for all, when the apparatus is adjusted.

A circuit-breaker S is also included in the main circuit of the machine. Said circuit-breaker will preferably be of the sudden release type, such as the one precedently described (Figs. 1 to 8). The release of said circuit is operated through a coil U included in a shunt $W^1$ passing through contacts E—F.

Figure 13:
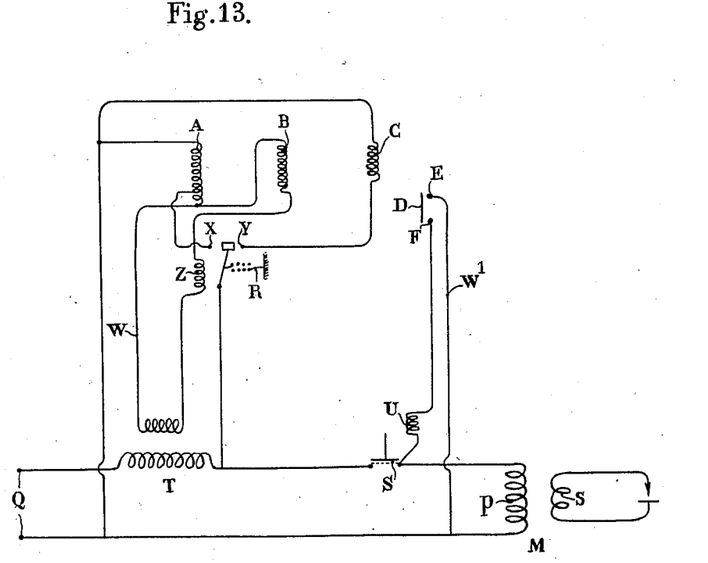
Fig. 13 is a diagrammatic view of the connections.

In the position shown in Fig. 13, the device is at rest. The movable structure including J—K—D—G is then under the influence of electro-magnet C which is traversed by a current. The disk is then rotated until it comes to butt against stop H which is adjusted in a determined position which corresponds to the quantity of energy that it is desired to cause to pass through the pieces to be welded.

When the compression that is exerted on said pieces has reached a certain predetermined value, circuit-breaker S is closed, either manually, or through an automatic device operated by said compressing action as it has been already explained.

It may then occur that for various reasons, such as the presence of dirt or thick rust on the pieces, the latter do not allow the secondary current of welding transformer M to pass. The primary $p$ is then traversed by a very small current, which is the current normally flowing through said transformer when the latter is not in operation. A portion of this current flows through the secondary of the intensity transformer T and through electro-magnets Z and B, but said current is not sufficient for causing the armature of electro-magnet Z to be applied against contact X. The current is kept flowing through electro-magnet C which maintains finger G of the movable disk against stop H. Therefore circuit breaker S will not be released. After a rather short time, the abnormal operation of the apparatus calls itself to the attention of the operator who may then eliminate the causes thereof.

On the contrary when the working of the apparatus is normal, the current flows through the pieces to be welded. The primary current of the machine shortly reaches a high value which depends on the tension in the feed circuit when the circuit of the machine is being closed, and on the degree of cleanliness of the pieces. Accordingly, the armature of electro-magnet Z is applied against contact X which causes the current passing through electro-magnet C to be cut off and sets up a current in electro-magnet A. The actions of electro-magnets A and B then produce a torque in the rotary part of the device. Disk J is set in rotation up to the moment corresponding to the closing of contacts E—F by small blade D. At this instant, the current is set up in shunt $W^1$ so that electro-magnet U is energized and produces the release of circuit-breaker S.

The welding current is thus cut off when a determined quantity of current has passed through the pieces to be welded. The armature of electro-magnet Z is finally brought back against contact Y under the action of spring R, thus reestablishing the current through electro-magnet C which rotates disk J back to its original position with finger G against stop H.

The apparatus is thus automatically brought back to its original position, in which it is ready to operate again for producing the next welding.

The regulation of the required quantity of energy is effected by means of wheel V. Said regulation is absolutively progressive and makes it possible to accurately determine the quantity of energy that is required for each welding operation.

Figure 14:
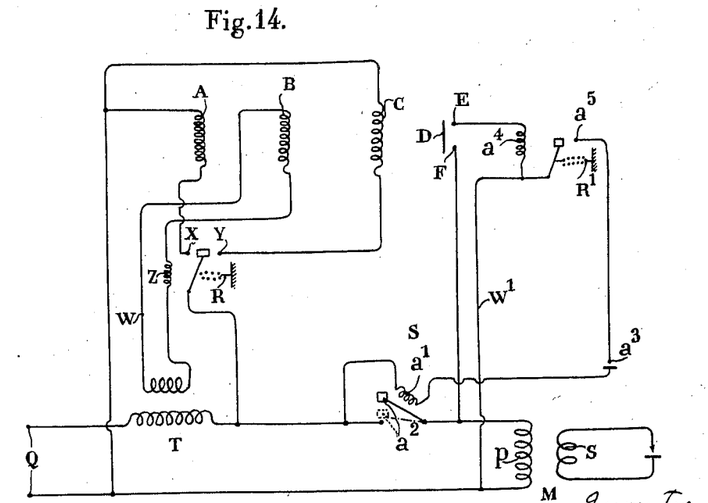
Fig. 14 is a similar diagrammatic view corresponding to a different embodiment.

Fig. 14 is a diagram of another embodiment in which the sudden release circuit-breaker S is replaced by a magnetic blow out contactor. It is known that these apparatus are controlled by means of an electro-magnet and that the current is set up in the machine by acting on an operating contact which closes the coil circuit of said contactor.

In this embodiment, the energy meter circuit breaker which has been described cuts off the circuit of said coil and thus produces the release of the contactor when the predetermined quantity of energy has flowed through the pieces to be welded. Coil $a^1$ of contactor $a^2$ is fed through operating contact $a^3$ and the armature of an auxiliary electro-magnet $a^4$, which is in shunt on contacts E—F. Said armature is submitted to the action of a spring $R^1$ which normally maintains the contact closed in $a^5$.

When at the end of the rotation of the movable parts, blade D connects contacts E—F, electro-magnet $a^4$ is energized and cuts the circuit of coil 1 of the contactor, which produces the release of the latter.

While I have disclosed what I deem to be the preferred forms of my machine, I do not wish to be limited thereto as there might be changes made in the construction disposition and form of the parts without departing from the spirit of my invention as comprehended within the scope of the appended claims.

What I claim is:

1. In an electric welding machine of the type described having electrodes for applying pressure to the pieces to be welded and a mechanism for pressing the electrodes together including two relatively movable parts whose relative displacement from their normal relation is proportional to the pressure applied between the electrodes, the combination of contact members controlling the welding circuit and mounted on said relatively movable parts, respectively, so that a predetermined displacement of said relatively movable parts brings said contact members into contact with each other, resilient means tending to urge said contact members apart, a toggle interposed between one contact member and one of said relatively movable parts, and means for breaking said toggle.

2. In an electric welding machine of the type described having electrodes for applying pressure to the pieces to be welded and a mechanism for pressing the electrodes together including two relatively movable parts whose relative displacement from their normal relation is proportional to the pressure applied between the electrodes, the combination of contact members controlling the welding circuit and mounted on said relatively movable parts, respectively, so that a predetermined displacement of said relatively movable parts brings said contact members into contact with each other, resilient means tending to urge said contact members apart, a toggle interposed between one contact member and one of said relatively movable parts, means for breaking said toggle, and means operative on return of the relatively movable parts to their normal relation to reset the toggle.

3. In an electric welding machine of the type described having electrodes for applying pressure to the pieces to be welded and a mechanism for pressing the electrodes together including two relatively movable parts whose relative displacement from their normal relation is proprtional to the pressure applied between the electrodes, the combination of contact members controlling the welding circuit and mounted on said relatively movable parts, respectively, so that a predetermined displacement of said relatively movable parts brings said contact members into contact with each other, resilient means tending to urge said contact members apart, a toggle interposed between one contact member and one of said relatively movable parts, means actuated by a further displacement of said relatively movable parts to break said toggle, and means operative on return of the relatively movable parts to their normal relation to reset the toggle.

4. The combination according to claim 3, in which the means for breaking the toggle includes an adjustable stop on one of the relatively movable parts adapted to come in contact with part of the toggle.

5. In an electric welding machine of the type described having electrodes for applying pressure to the pieces to be welded and a mechanism for pressing the electrodes together including two relatively movable parts whose relative displacement from their normal relation is proportional to the pressure applied between the electrodes, a combination of contact members controlling the welding circuit and mounted on said relatively movable parts, respectively, so that a predetermined displacement of the relatively movable parts brings the contact members into contact with each other, a resilient element interposed between one of said contact members and one of the relatively movable parts to permit bodily movement of said contact members on a further displacement of said relatively movable part after the contact members have been brought together, a toggle interposed between the other contact member and the other of said relatively movable parts, resilient means tending to urge said contact members apart, and means actuated by a further displacement of said relatively movable parts after the contact members have been brought together to break said toggle.

6. In an electric welding machine of the type described having electrodes for applying pressure to the pieces to be welded and a mechanism for pressing the electrodes together including two relatively movable parts whose relative displacement from their normal relation is proportional to the pressure applied between the electrodes, the combination of contact members controlling the welding circuit and mounted on said relatively movable parts, respectively, so that a predetermined displacement of said relatively movable parts brings said contact members into contact with each other, resilient means tending to urge said contact members apart, a toggle interposed between one contact member and one of said relatively movable parts, and electromagnetic means actuated by the flow of current in the welding circuit to break the toggle.

7. An electric welding machine of the type described comprising in combination a frame, two electrodes adapted to receive between them the pieces to be welded, a rotatable lever and an operative connection between said lever and one of said electrodes including a casing articulated to said lever and adapted to slide with respect to said frame, two guiding rods parallel to the direction in which slides said casing mounted therein, two transverse supporting members slidably mounted on said rods, two pairs of contact studs adapted to control the flow of the heating current through the electrodes mounted on said supporting members opposite each other respectively, elastic means interposed between said members tending to force them apart, elastic means between one of said elements and the corresponding end of the casing, a rod adapted to slide with respect to the casing and to project thereinto, operating means actuated by the operator for imparting a sliding motion to said rod, a spring interposed between a point of said rod and the casing, a release mechanism interposed between the second supporting member and the end of said rod, and means for operating said release mechanism consisting of an electro-magnetic device controlled by flow of current in the welding circuit.

8. An electric welding machine of the type described comprising in combination a stationary frame, two electrodes adapted to receive between them the pieces to be welded, articulated means for moving one of said electrodes including a lever pivotally mounted on the frame, an operating lever pivotally mounted on said lever, a spring interposed between said levers, a bent arm pivotally mounted on said first named lever, a pair of contact studs for the heating circuit mounted at the end of said arm, a second arm articulated to the same lever, a pair of contact studs mounted at the end of said arm opposite the first mentioned contact studs, elastic means interposed between said arms for forcing them apart, a rod integral with the first named lever, elastic means interposed between a point of said rod and the second named articulated arm, a release mechanism interposed between the operating lever and the bent arm, whereby said studs come into contact with each other respectively only when said spring has been given a certain compression, and means for operating said release mechanism whereby said contact studs are suddenly moved away from each other.

9. A welding machine according to claim 8 in which the means for operating the release mechanism consist of an adjustable stop fixed to the first named lever.

10. A welding machine according to claim 8 in which the means for operating the release mechanism consist of an electro-magnetic device controlled by flow of current in the welding circuit.

11. An electric welding machine of the type described comprising in combination a frame, two electrodes adapted to receive between them the pieces to be welded, a rotatable lever and an operative connection between said lever and one of said electrodes including a casing articulated to said lever and adapted to slide with respect to said frame, two guiding rods, parallel to the direction in which slides said casing, mounted therein, two transverse supporting members slidably mounted on said rods, two pairs of contact studs adapted to control the flow of the heating current through the electrodes mounted on said supporting members opposite each other respectively, elastic means interposed between said members tending to force them apart, elastic means between one of said elements and the corresponding end of the casing, a rod adapted to slide with respect to the casing and to project thereinto, operating means actuated by the operator for imparting motion to said rod, a spring interposed between a point of said rod and the casing, a link articulated to the second supporting member, a second link articulated to the end of said link and to the end of said rod, means for normally keeping said links in line, whereby the motion of said rod is transmitted to said second supporting member through said links, and an adjustable stop mounted on one of said guiding rods for engaging one of said links and causing them to suddenly rotate about their common axis of articulation, whereby the second supporting member is pulled away from the first one and the contact studs are suddenly separated.

12. An electric welding machine of the type described comprising in combination a transformer, two electrodes connected to the secondary of said transformer, means for suddenly cutting off the current in the primary circuit of the transformer, a movable element for controlling said means, electro-magnetic means connected to the primary circuit of the transformer adapted to move said element in one direction in proportional relation to the flow of energy through the system, and means brought into operation by the interruption of the welding current to urge said movable element to move in the reverse direction.

13. An electric welding machine of the type described comprising in combination a transformer, two electrodes connected to the secondary of said transformer, a circuit-breaker in the primary circuit of said transformer, a rotary disk adapted to control the opening of said circuit-breaker, an electro-magnet adapted to move said disk through an angle proportional to the flow of energy through the system, means for connecting said electro-magnet to the primary circuit of the transformer, means for stopping said disk in a determined angular position, an electro-magnet adapted to bring said disk into said position, and means for energizing the last mentioned electro-magnet when the primary circuit of the transformer is opened.

14. An electric welding machine of the type described comprising in combination a transformer, two electrodes connected to the secondary of said transformer, a circuit-breaker in the primary circuit of the transformer, electro-magnetic means for operating said circuit-breaker, two spaced apart contact elements in the circuit of said electro-magnetic means, a rotary disk, a conducting blade integral with said disk for electrically connecting said contact elements and thereby causing said circuit-breaker to be operated, an electro-magnet adapted to rotate said disk in the direction that brings said disk against said contact elements, a step down transformer in the primary circuit of the above mentioned transformer, an electro-magnet in the secondary circuit of said step down transformer, a contact, operated by the last mentioned electro-magnet for closing the circuit of the first mentioned electro-magnet, and means operative on interruption of the primary circuit of the welding transformer to bring back the rotary disk to a determined starting position.

15. An electric welding machine of the type described comprising in combination a transformer, two electrodes connected to the secondary of said transformer, a circuit-breaker in the primary circuit of said transformer, electromagentic means for operating said circuit-breaker, two spaced apart contact elements in the circuit of said electro-magnetic means, a rotary disk, a conducting blade integral with said disk for electrically connecting together said contact elements and thereby causing said circuit breaker to be operated, an adjustable stop, a finger integral with said disk adapted to come into contact with said stop, an electro-magnet adapted to rotate said disk in the direction that brings said blade against said contact elements, a second electro-magnet adapted to rotate said disk in the opposite direction so as to apply said finger against said stop, a movable switch for sending shunted current from the primary circuit of the above mentioned transformer through either of said electro-magnets a spring for forcing said switch into the position that sends the electric current into the second mentioned electro-magnet, a step down transformer in the primary circuit of the first mentioned transformer, an auxiliary electro-magnet in the secondary circuit of said step down transformer adapted to bring said switch into the position that sends current into the first mentioned electro-magnet, and an electro-magnet in the secondary circuit of said step down transformer adapted to rotate the disk in the same direction as the first mentioned electro-magnet.

16. An electric welding machine of the type described according to claim 12, in which the means for suddenly cutting off the current consist of a magnetic blow out contactor.

17. An electric welding machine according to claim 13 further comprising a permanent magnet positioned to brake the displacement of said disk.

18. In an electric welding machine of the type described, the combination of a welding circuit containing the welding electrodes, an unrestrained energy meter actuated by flow of energy in the welding circuit, a circuit opener in the welding circuit operated by said energy meter on completion of a predetermined movement thereof, and means automatically brought into operation by the opening of said welding circuit to return said energy meter to its initial position.

JEAN ACHARD.